July 2, 1946.  E. W. ESDAILE  2,403,354
SUSPENSION FOR COMPASSES AND SIMILAR INSTRUMENTS
Filed Nov. 27, 1944
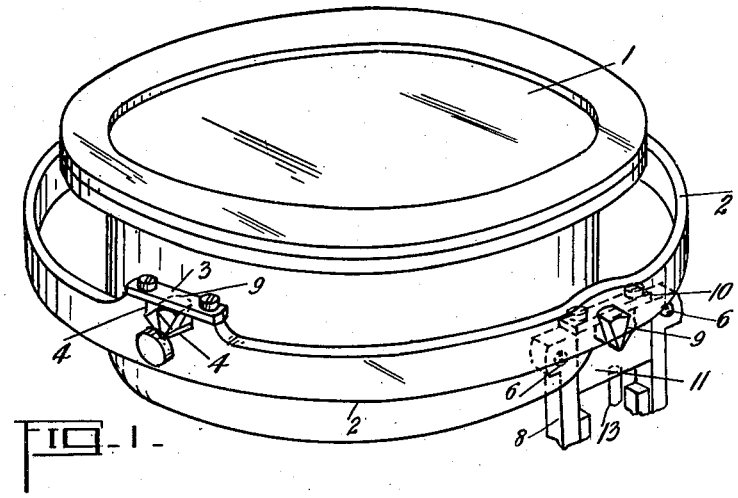
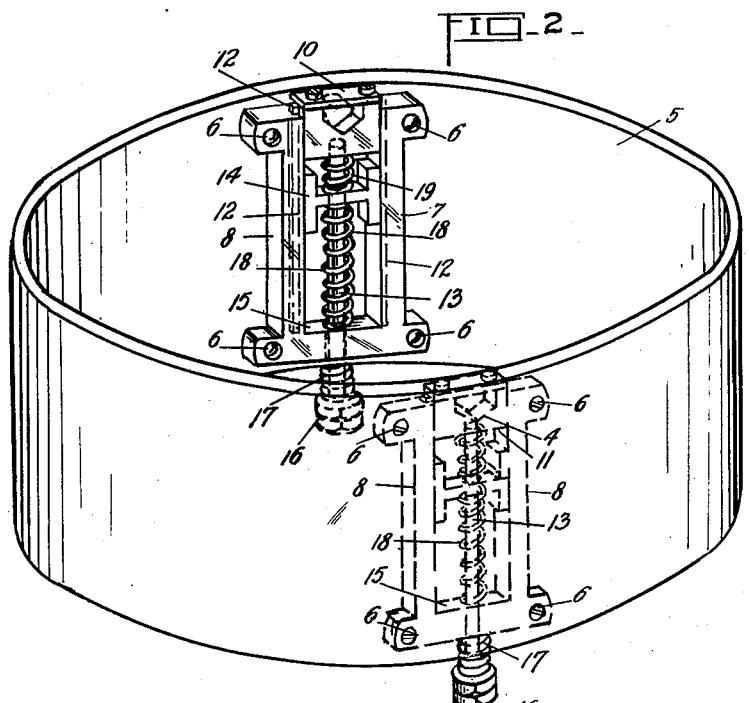
Inventor
E. W. Esdaile
By Glenock Downey Liebold
Attys.

Patented July 2, 1946

2,403,354

UNITED STATES PATENT OFFICE 2,403,354

SUSPENSION FOR COMPASSES AND SIMILAR INSTRUMENTS

Edward William Esdaile, Sydney, New South Wales, Australia

Application November 27, 1944, Serial No. 565,303
In Australia November 17, 1943

2 Claims. (Cl. 248—358)

The object of my invention is to minimise the effect of vibration upon relatively delicate instruments, for example ships' compasses.

The invention provides suspensary means whereby rapidly repeated shocks of varying intensity and periodicity are absorbed and prevented from affecting the instrument.

My apparatus is readily adaptable to the conditions of its employment, and when used to suspend ships' compasses and the like may take the form illustrated in the accompanying drawing wherein:

Fig. 1 is a perspective view of a ship's compass supported in a gimbal.

Fig. 2 a similar view with the compass and the gimbal ring removed.

The compass 1 is suspended in the gimbal ring 2 by a knife edged lug 3 which projects from the compass and is received by a bearing notch 4 in gimbal ring 2.

A binnacle head 5 is fixed upon a standard in the usual way and has fixed within by studpins 6 the diametrically opposed frames 7 and 8.

In the top of each frame is a V shaped notch forming a bearing for a V shaped bearer stud 9 projecting from gimbal ring 2.

A cross head 11 is slidable vertically in grooves 12 in the frame and a bearing cap 10 screwed to the top of the crosshead prevents the pin 9 from leaving its bearing.

A spindle 13 is fixed at its upper end in the crosshead 11 and passes freely through a cross head plate 14 and through a horizontal bottom member 15 of the frame.

Upon the end of the spindle are adjusting nuts 16. A spring 17 sleeved upon the bottom of the spindle serves as a recoil or reaction device.

Compression springs 18 and 19 of dissimilar resiliency are sleeved upon the spindle, spring 18 pressing against the underside of the cross head plate 14 and upon the top of the bottom member 15 of the frame.

Spring 19 is compressed between the top of the cross head plate 14 and the underside of the crosshead 11.

It will be understood that the invention depends upon the quenching effect of the several springs which are of dissimilar length and natural periodicity and which overcome a tendency such as might occur if only one spring were employed and which would violently and sympathetically respond to vibrations set up, for example, by an engine, or other machinery in motion, or by wave action or other medium.

The lower spring controls not only the period of the other two springs, but also controls the tension to allow for instruments of different weight.

I claim:

1. Means for minimising the effect of vibration upon ships' compasses and other relatively delicate instruments comprising in combination a mounting means such as a gimbal and wherein the instrument is suspended, diametrically opposed frames fixed within a binnacle head, a cross head and a crosshead plate slidable in each frame, a spindle fixed at its upper end to the crosshead and passing freely through the crosshead plate and through a member of the frame, springs of dissimilar resiliency sleeved upon the spindle and a recoil spring sleeved upon the end of the spindle whereon are adjusting nuts.

2. In apparatus according to claim 1, a spindle slidable in a frame and having sleeved upon it a plurality of spiral springs.

EDWARD WILLIAM ESDAILE.